(12) United States Patent
Fata (10) Patent No.: US 11,581,847 B2
(45) Date of Patent: Feb. 14, 2023

(54) PHOTOVOLTAIC AND ELECTROMAGNETIC POWERED MOBILE ELECTRIC VEHICLE CHARGING STATION

(71) Applicant: Henry Kamahoahoa Fata, Las Vegas, NV (US)

(72) Inventor: Henry Kamahoahoa Fata, Las Vegas, NV (US)

( * ) Notice: Subject to any disclaimer, the term of this patent is extended or adjusted under 35 U.S.C. 154(b) by 0 days.

(21) Appl. No.: 17/233,484

(22) Filed: Apr. 17, 2021

(65) Prior Publication Data
US 2021/0323429 A1   Oct. 21, 2021

Related U.S. Application Data

(60) Provisional application No. 63/011,346, filed on Apr. 17, 2020.

(51) Int. Cl.

| | | |
|---|---|---|
| *H02S 40/22* | (2014.01) | |
| *B60L 53/51* | (2019.01) | |
| *B60L 53/35* | (2019.01) | |
| *B60L 53/57* | (2019.01) | |
| *B60L 53/20* | (2019.01) | |
| *B60L 50/40* | (2019.01) | |
| *B60L 50/60* | (2019.01) | |
| *B60L 53/12* | (2019.01) | |
| *H02J 7/35* | (2006.01) | |
| *H02J 50/27* | (2016.01) | |
| *H02J 7/02* | (2016.01) | |
| *B60L 53/14* | (2019.01) | |

(Continued)

(52) U.S. Cl.
CPC ............. *H02S 40/22* (2014.12); *B60L 50/40* (2019.02); *B60L 50/60* (2019.02); *B60L 53/12* (2019.02); *B60L 53/14* (2019.02); *B60L 53/20* (2019.02); *B60L 53/35* (2019.02); *B60L 53/51* (2019.02); *B60L 53/57* (2019.02); *H02J 7/02* (2013.01); *H02J 7/35* (2013.01); *H02J 50/27* (2016.02); *H02S 10/00* (2013.01); *H02S 10/40* (2014.12); *B60L 2210/10* (2013.01); *B60L 2210/40* (2013.01)

(58) Field of Classification Search
CPC .......... H02J 50/27; B60L 53/51; H02S 40/22; H02S 10/00; H02S 10/40
See application file for complete search history.

(56) References Cited

U.S. PATENT DOCUMENTS

| | | | |
|---|---|---|---|
| 8,627,908 B2 * | 1/2014 | Wellborn | B60L 15/42 |
| | | | 701/96 |
| 9,865,760 B1 * | 1/2018 | Jacobs | F24S 30/40 |

(Continued)

FOREIGN PATENT DOCUMENTS

| | | | | |
|---|---|---|---|---|
| EP | 3719311 A1 * | 10/2020 | ............. | F03D 17/00 |
| WO | WO-2008124362 A2 * | 10/2008 | ......... | H01L 31/0547 |

*Primary Examiner* — Adi Amrany
(74) *Attorney, Agent, or Firm* — Lewis Roca Rothgerber Christie LLP (57) ABSTRACT

A mobile charging station generating electricity by an Enclosed Photovoltaic Device and electromagnetic energy receiving unit, mounted on top of an Electric Vehicle Platform or chassis, housing a power storage system, inverters, power outlets and wireless power transmitters to provide electricity to the electric vehicle platform and other electric vehicles. This mobile charging station is configured to be autonomously driven to any location where vehicles can be recharged at any time.

22 Claims, 6 Drawing Sheets

(51) Int. Cl.
*H02S 10/00* (2014.01)
*H02S 10/40* (2014.01)

(56) References Cited

U.S. PATENT DOCUMENTS

| | | | | |
|---|---|---|---|---|
| 2003/0213514 A1* | 11/2003 | Ortabasi | ............ | H01L 31/0521 |
| | | | | 136/246 |
| 2008/0251112 A1* | 10/2008 | Jenkins | ............... | H01L 31/0547 |
| | | | | 136/246 |
| 2010/0295751 A1* | 11/2010 | Sheers | ................... | H01Q 1/10 |
| | | | | 343/901 |
| 2011/0067750 A1* | 3/2011 | Ueda | ...................... | F24S 50/20 |
| | | | | 136/246 |
| 2011/0192460 A1* | 8/2011 | Tan | ......................... | F24S 23/70 |
| | | | | 136/257 |
| 2011/0260470 A1* | 10/2011 | Ahmadi | ................... | H02S 10/12 |
| | | | | 290/55 |
| 2012/0132255 A1* | 5/2012 | Schmaelzle | ......... | H01L 31/0543 |
| | | | | 136/248 |
| 2012/0291849 A1* | 11/2012 | Fata | .................... | H01L 31/0543 |
| | | | | 136/246 |
| 2012/0313568 A1* | 12/2012 | Paluszek | ................ | H02J 7/0042 |
| | | | | 320/101 |
| 2014/0018990 A1* | 1/2014 | Kataoka | ................... | H04Q 9/00 |
| | | | | 320/134 |
| 2014/0217820 A1* | 8/2014 | Imai | ....................... | H02J 7/0068 |
| | | | | 307/26 |
| 2014/0375272 A1* | 12/2014 | Johnsen | ............... | B60L 53/305 |
| | | | | 320/136 |
| 2015/0248118 A1* | 9/2015 | Li | .......................... | G06N 3/084 |
| | | | | 706/12 |
| 2016/0304025 A1* | 10/2016 | King | ....................... | H02S 40/22 |
| 2018/0080436 A1* | 3/2018 | Tibbott | .................. | F24S 23/31 |
| 2018/0106443 A1* | 4/2018 | Shannin | ................ | F21V 14/003 |
| 2018/0264955 A1* | 9/2018 | Gupta | ...................... | B60L 58/12 |
| 2019/0087878 A1* | 3/2019 | Gharabegian | ............ | A45B 3/02 |
| 2019/0157484 A1* | 5/2019 | Satterfield | ............ | H01L 31/048 |
| 2019/0351773 A1* | 11/2019 | Merritt | .................... | B60L 53/52 |
| 2020/0067352 A1* | 2/2020 | Kothari | ................... | H02J 50/80 |
| 2020/0091863 A1* | 3/2020 | Angel | ................... | H02S 40/425 |
| 2020/0285925 A1* | 9/2020 | Salman | .............. | G06K 19/0708 |
| 2020/0307401 A1* | 10/2020 | Mondello | .......... | H04L 63/0823 |
| 2021/0070339 A1* | 3/2021 | Delgatty | ................ | B60R 25/24 |

\* cited by examiner

PHOTOVOLTAIC AND ELECTROMAGNETIC POWERED MOBILE ELECTRIC VEHICLE CHARGING STATION

This application claims priority to U.S. Provisional Application No. 63/011,346, "Photovoltaic and Wireless Powered Mobile Electric Vehicle Charging Station" filed on Apr. 17, 2020 which is hereby incorporated by reference.

The application is related to US Patent application Serial No. 20120291849A1 entitled "Enclosed Photovoltaic Device", filed on May 14, 2012. The specifications and claims of all of the above patents and patent applications are incorporated herein by reference.

BACKGROUND

Field of Invention

The present invention generally relates to a mobile electric generating transport that harvests, generates, stores and delivers energy to electric motor vehicles.

Discussion of Prior Art

Mobile electric generators use solar, wind and/or fuel-generated power and are towed to locations to charge electric vehicles.

Similar to generators, electric vehicles have a shorter range than gas-powered vehicles, recharging takes time, and it is difficult to find a charging station. And most of these generators are used as back up power supply in emergency situations. As more electric vehicles become common transportation, so does the need for a steady power generating station that can operate in all hours without running out of power.

OBJECTS OF THE INVENTION

Mobile generators use liquid fuel, inefficient renewable energy technology and/or grid connected power sources in charging electric vehicles. Because of their energy density limitations, they are not ideal for charging electric vehicles due to transport costs, maintenance, and lengthy recharging time. To counter these limitations, this invention is comprised of a mobile electricity power generating station with an enclosed photovoltaic system where sunlight or light is collected by a photon receiver to direct incident light to photovoltaic cells that generate electricity; and a wireless energy charging system that uses a rectenna to receive electromagnetic energy from a transmitting power source, and the energy is converted by a rectifier into electricity. Electricity is stored in a battery, and is discharged through power plug outlets and wireless energy transmitters to charge electric vehicles. The benefits of this mobile charging station are generating power in any location; regenerating power without any reliance on any liquid fuel and electric grid connected sources; and short recharging times for electric vehicles. The charging station is complete with electric plug units and wireless power transmission to allow convenient charging capabilities for multiple vehicles.

The object of this invention is to charge electric vehicles without any dependence of any power grid or liquid fueled generator; overcome vehicle range anxiety, maintenance and finding stationary charging stations.

SUMMARY OF THE INVENTION

Described herein are several embodiments of a mobile charging station that include a mobile transport system, a photovoltaic and electromagnetic power generation system that use sun-light and electromagnetic energy to generate electricity that is stored and then discharged to electric vehicles. A method of using the mobile charging station to generate electricity to power the platform and discharge electricity to other electric vehicles is additionally described herein.

More specifically, described herein, in a first embodiment, is an Enclosed Photovoltaic Device comprise of a photon receiver and sun tracking system attached on top of the device that collects natural and artificial photons or sunlight. The light is directed within the device to photovoltaic cells that absorb the light to generate electricity. The device is attached to the mobile transport system or base.

The mobile charging station can further comprise a rectenna, a rectifier, tracking system and telescopic mast. The telescopic mast comprise of a first end and second end. The rectenna and rectifier, tracking system is attached to the second end of the telescopic mast that receive electromagnetic energy from a transmitting source and a rectifier converts the received energy into electricity. The telescopic mast can comprise a electro-mechanical screwdrive mast with self-locking mast sections for extension and retraction at varying height ranges. The first end is attached to the mobile transport system or base.

The mobile charging station can comprise a mobile transport system or Electric Vehicle platform of a battery and supercapacitor housing. The platform houses both battery and supercapacitor separately where the photovoltaic cells and rectifier are coupled to store and discharge electricity.

The electric vehicle platform can comprise a power management system, inverters, charge controller, electric motor and autonomous steering system.

The mobile charging station is retrofitted to a mobile transport system or flat, scalable modular electric vehicle platform comprise of charging or recharging functions with multiple power outlets and wireless energy transmitters to discharge electricity to the platform other systems, motors or load.

REFERENCE NUMERALS IN DRAWINGS

| | |
|---|---|
| 10 | photon receiver |
| 12 | lens |
| 14 | tracking system |
| 16 | photovoltaic device |
| 18 | rectenna |
| 20 | telescopic mast |
| 22 | electric vehicle platform |
| 24 | power plug outlet |
| 26 | wireless energy transmitter |

-continued

| 28 | solar cell |
| 30 | rectifier |
| 32 | charge controller |
| 34 | battery |
| 36 | supercapacitor |
| 38 | dc/dc converter |
| 40 | power management system |
| 42 | load |
| 46 | electric motor |
| 48 | incident light or energy |
| 50 | wheel |
| 51 | dc/ac inverter |

DETAILED DESCRIPTION OF THE DRAWINGS

The drawings depicted are not necessarily shown to scale and like or similar elements are designated by referenced numerals through several views.

It is understood that the drawings are for the purpose of describing particular implementations of the disclosure and are not intended to be limiting thereto. While most of the terms will be recognizable to those of ordinary skill in the art, it should be understood that when not explicitly defined, terms should be interpreted as adopting a meaning presently accepted by those of ordinary skill in the art.

It is understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

DESCRIPTION OF PREFERRED EMBODIMENTS OF THE INVENTION

Figure 1:
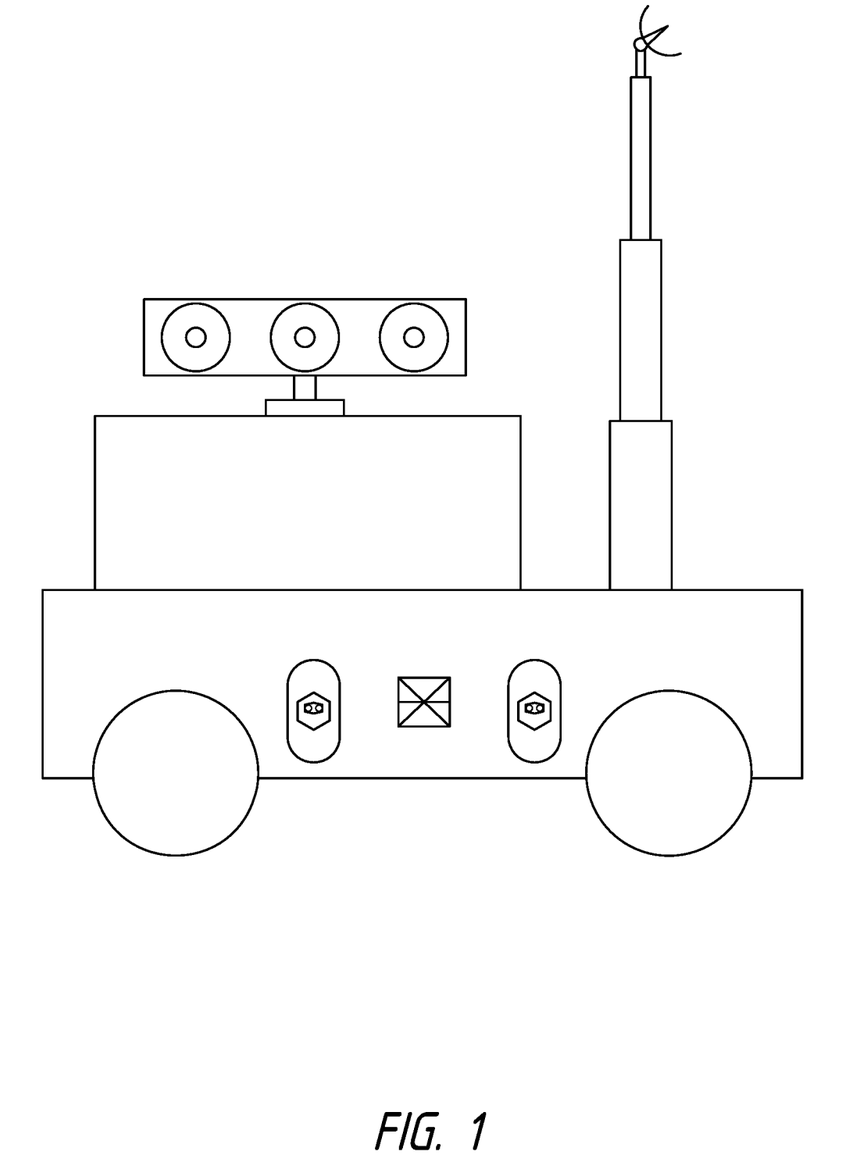
FIG. 1. Shows a side view of the Mobile Charging Electric Vehicle Station
Figure 2:
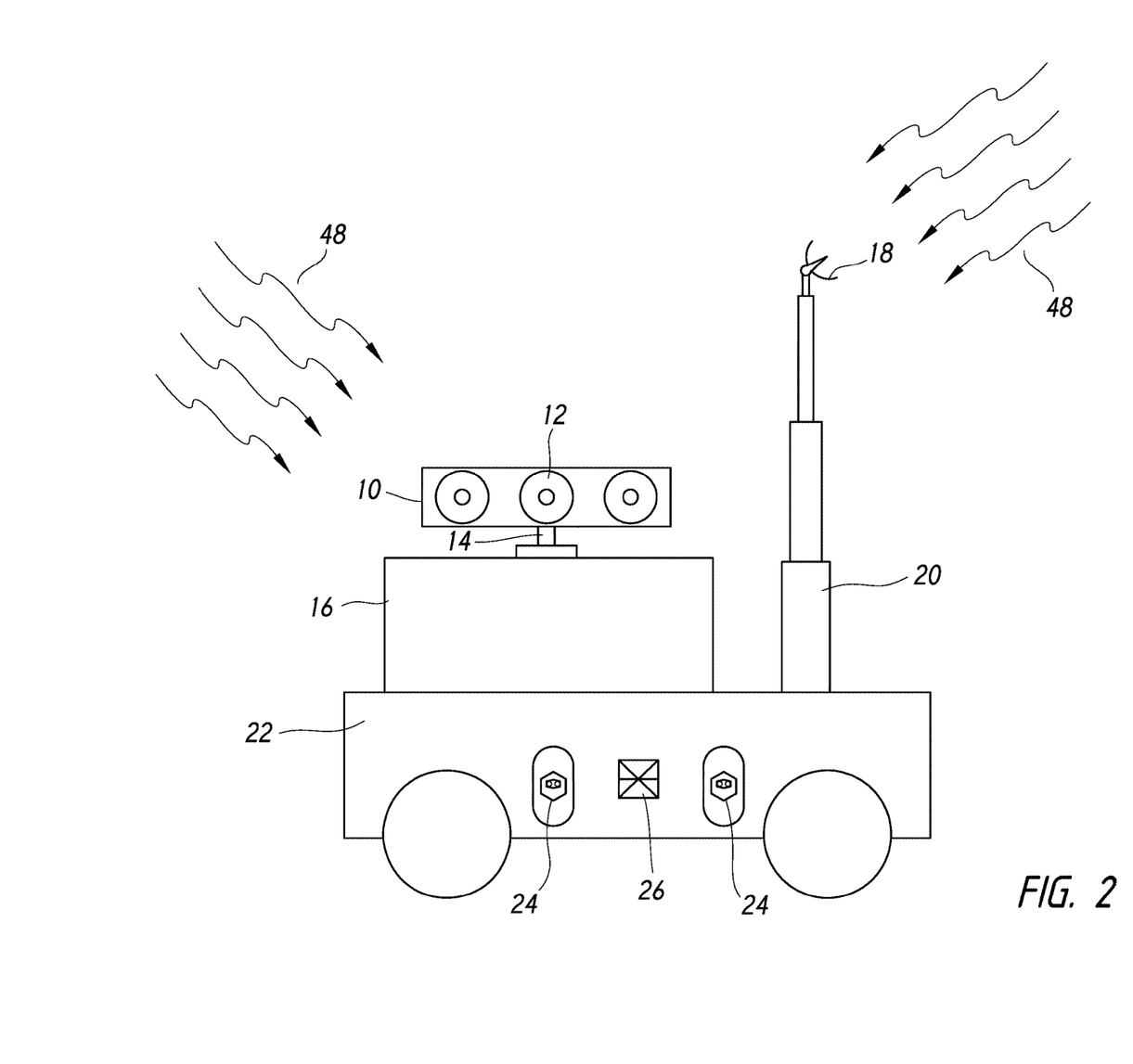
FIG. 2. Shows a view of an embodiment of the present invention

With reference to FIGS. 1 and 2, a preferred embodiment of the present invention is illustrated in FIG. 1. A mobile charging station equipped with an Enclosed Photovoltaic Device 16 and electromagnetic energy system 18 that are mounted and coupled to the electric vehicle platform 22. The mobile charging station is not connected to any power grid to charge or recharge the platform 22.

Figure 3:
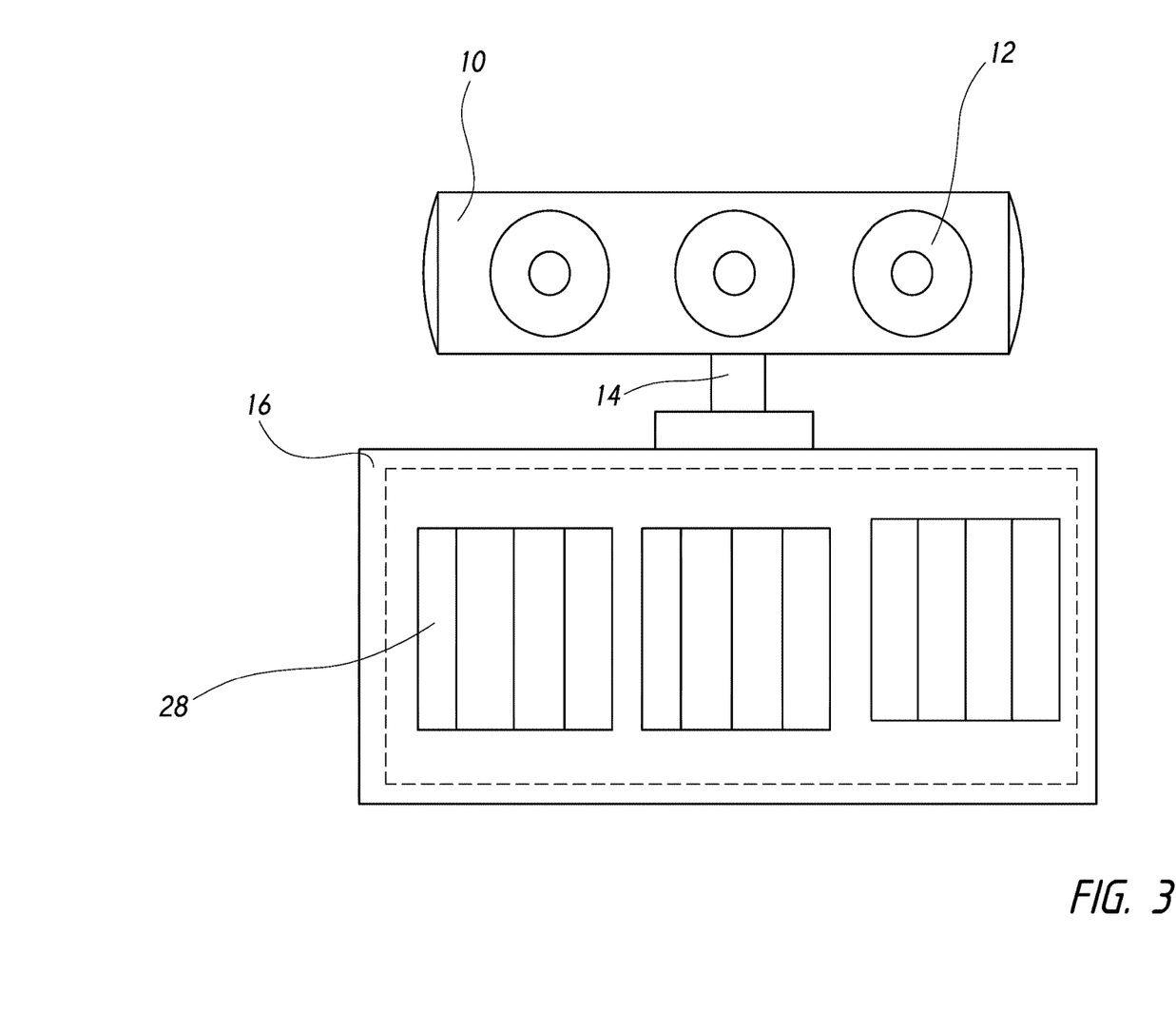
FIG. 3. Shows a view of the Photovoltaic Enclosed System

FIG. 3 The enclosed photovoltaic system 16 has a dual axis tracking system 14 and photon receiver 10 that tracks the Sun to collect photons or light 48. The light is than converted into electricity by photovoltaic cells 28. The photon receiver 10 can also collect any photon 48 from any natural or artificial light source. The light is collected by multiple lenses 12 built within the receiver 10.

The Photon receiver 10 is on a dual-axis tracking device 14 that uses sensors to track the sun to collect photons or solar energy 48. Using Global Position Satellite signals, the tracker 14 rotates on a 360 degree axis directing the receiver 10 to the sun at any given time and orient itself to face the sun to maximize power production during sunny and even cloudy periods.

The enclosed photovoltaic device 16 has one or multiple photovoltaic cells 28 arranged in tandem, stacked apart vertically or horizontally from one another, encased or enclosed within a transparent four sided square shaped or box configure with one or more reflective lens 12 embedded on each side that absorbs sunlight or artificial light 48. As light 48 enters the device, the light 48 is magnified by reflective lenses 12 and the photons 48 are absorbed by the solar cells 28 and electricity is then generated where it is then directed to the platform 22.

Figure 4:
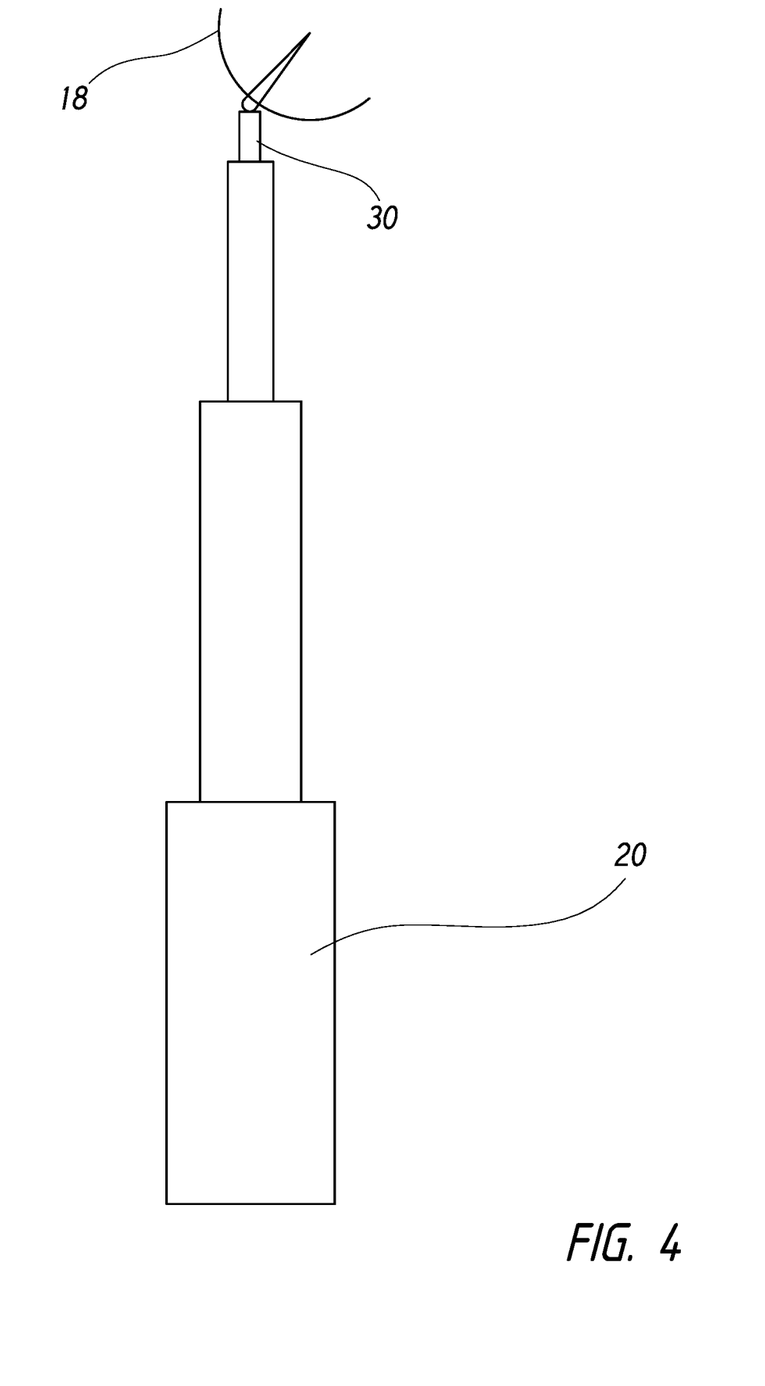
FIG. 4. Shows a view of the Electromagnetic Energy system

FIG. 4 In this embodiment, a rectenna 18, tracking system 14, and rectifier 30 are mounted atop a telescoping mast 20 to collect photons 48 and other electromagnetic energy 48 from a transmitting energy source 48. The telescoping mast 20, is programmed to extend and retract to collect the transmitted energy source 48. The rectenna 18, consists of a rectifier 30 that captures and converts the electromagnetic energy 48 and is converted into direct current power. The electricity is then directed to the platform 22.

Figure 5:
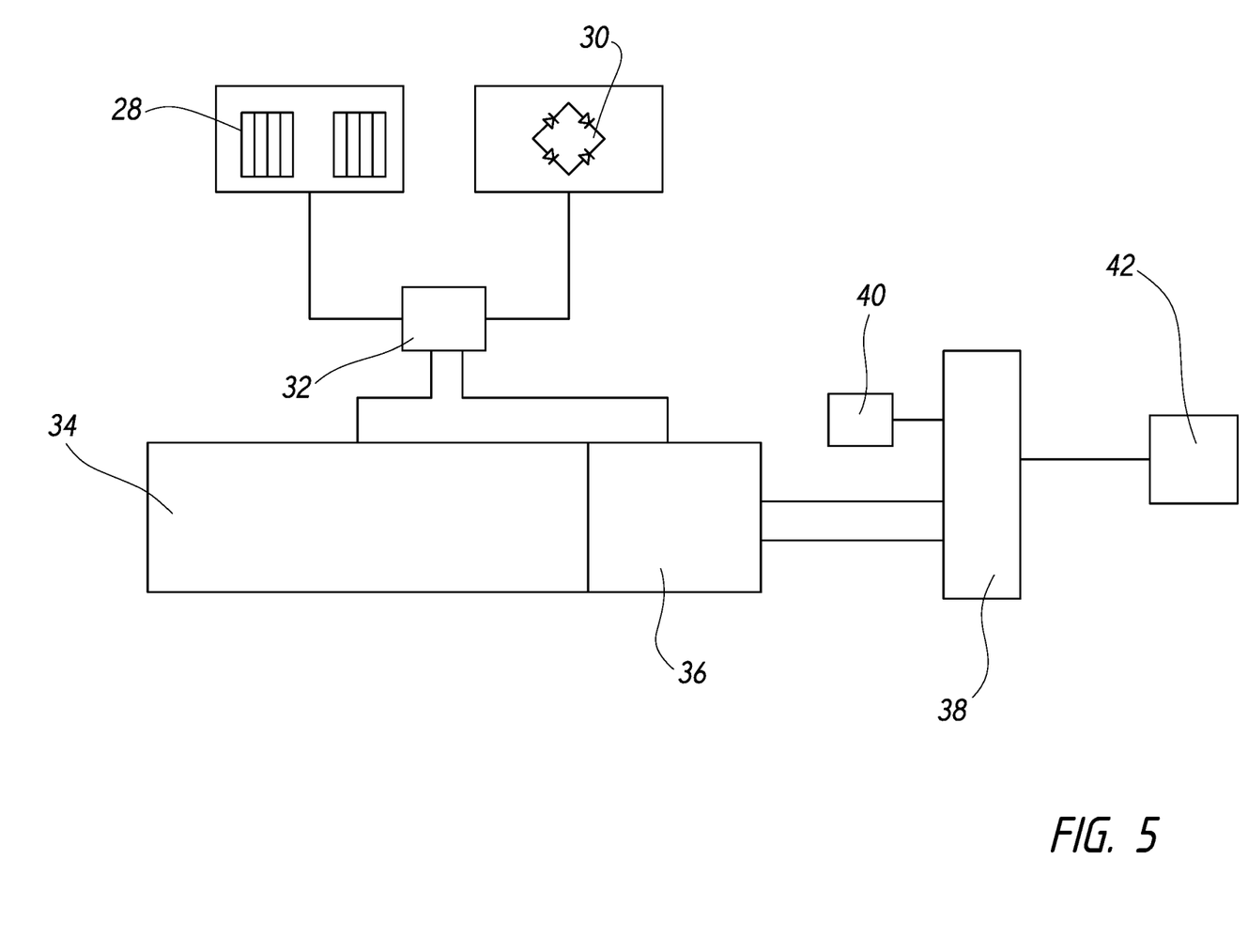
FIG. 5. Illustrates a block view of the main electrical components within the Electric Vehicle FIG. 6. Illustrates a view of the main Electric Vehicle charging systems

FIG. 5 In this simplified view of the basic electrical components for the platform 22, the solar cell 28 and rectifier 30 are connected to the charge controller 32. The cells 28 and rectifier are coupled to the battery 34 and supercapacitor 36 via charge controller 32.

The charge controller 32 can have what is known as a 3 stage charge cycle which includes bulk, absorption and float stages. During the bulk stage of the charge cycle, the charge controller 32 can let the charge voltage to the battery 34 and supercapacitor 36 gradually rises to the bulk level. When a bulk level voltage is reached by the batteries 34 and supercapacitor 36, the absorption stage begins. During the absorption stage, the battery 34 and supercapacitor 36 voltage is maintained at bulk voltage level for a specified tie while the current gradually tapers off as batteries 34 and supercapacitor 36 charge up. After the absorption time passes the battery 34 and supercapacitor 36 can be lowered to a float level voltage resulting in a small maintenance to power storage system current until the next cycle. The charge controller 32 keeps batteries 34 and supercapacitor 36 from overcharging. The charge controller 32 regulates the voltage and current coming from the solar cells 28 and rectifier 30 before going to the battery 34 and supercapacitor 36. The electricity is then directed to the DC/DC converter 38.

The DC/DC Converter 38 converts direct current (DC) from one voltage level to another. The main DC/DC converter 38 changes dc power from the high voltage battery 34 and supercapacitor 36 into lower dc voltages to power tracking systems 14, motors, and many other systems or load 42 on the platform 22. This high voltage to low voltage (HV-LV) dc-dc converter is critical for separating the control systems from high-voltage domains. The electricity is then directed and managed by the Power Management System 40.

The Power Management System 40 is in charge of controlling the electrical system. Its task is to make sure that the electrical system is safe and efficient. If power consumption is larger than the power production capacity, load shedding or load reduction is executed to avoid power loss. Automatic synchronizing, load sharing, analysis and monitoring are one of the main features of this system and the discharge from battery 34 and supercapacitor 32 to the power outlets 24 and wireless energy transmitters 26 assure safety for charging electric vehicles.

Figure 6:
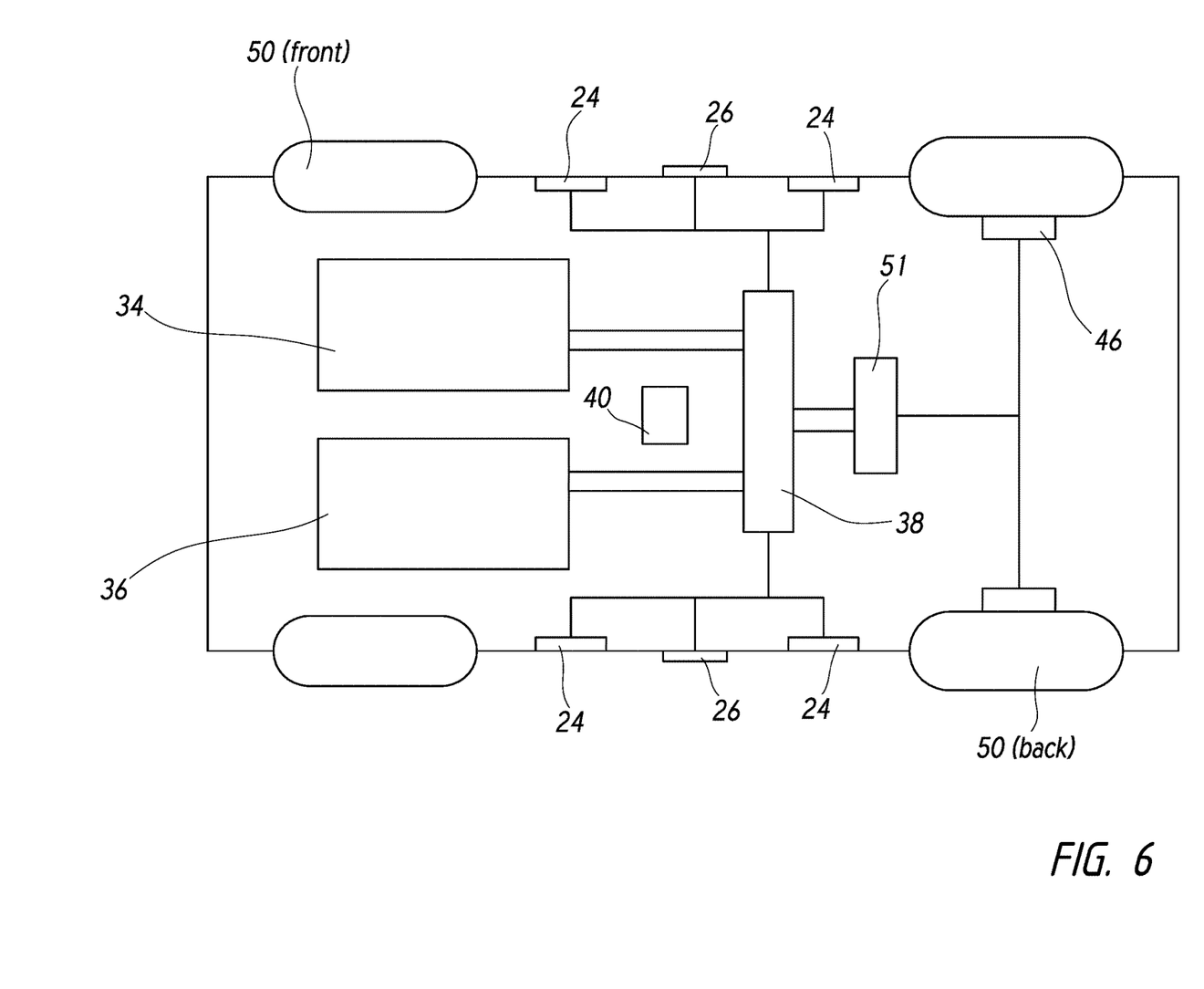

FIG. 6. The Electric Vehicle Platform 22 is a Battery-Electric Vehicle type which can be retrofitted since they are a flat, scalable and modular system, that contains brakes, suspension, motor 46, drivetrain, battery pack 34, supercapacitor 36, Power Management System 40, DC/DC Converter 38, power outlets 24, wireless energy transmitter 26, and load 42. The platform 22 is basically a skateboard design consisting of wheels 50 and battery packs 34 without any complex moving parts found in typical combustion engine vehicles. The electricity is directed to power the platform, the inverter 51 to power the electric motors 46 and the power plug outlets 24 and wireless energy transmitters 26.

The mobile electricity generating station can provide electricity to any location in whatever the user or electric vehicle requires.

Second, the mobile electricity generation station allows one or more of the following events to occur—i) allow the photovoltaic device 16 to transform light into electricity, and ii) allowing the rectenna 18 to transform electromagnetic energy into electricity. This combination of energy generation allows the platform 22 to never be low on power, even while discharging to recharge electric vehicles. The self charging system allows the mobile charging station to recharge itself and discharge to other electric vehicles. Any user would simply just summon the mobile charging station, use the charging plugs 24 to recharge their vehicle or simply drive nearby to align with the wireless transmitter 26 for a wireless recharge. This mobile electricity generating station can be located anywhere where electricity is not already supplied.

In the foregoing description, it will be readily appreciated by those skilled in the art that modifications may be made to the invention without departing from the concepts disclosed herein. Such modifications are to be considered as included in the following claims, unless those claims by their language expressly state otherwise.

What is claimed is:

1. An electric vehicle platform, comprising:
    a light receiver, wherein said light receiver:
        comprises a plurality of lenses, and
        is operable to collect light energy through said plurality of lenses;
    a photovoltaic device operably connected to said light receiver, wherein:
        said photovoltaic device is in light communication with said light receiver and is operable to receive said light energy,
        a transparent four sided box is comprised in said photovoltaic device,
        said photovoltaic device is configured to deliver said light energy to said four sided box;
        one or more photovoltaic cells are stacked apart vertically or horizontally in said four sided box,
        said photovoltaic cells are operable to convert said light energy to electrical energy, and
        one or more reflective lenses are associated with said four sided box;
    a battery electrically connected to one or more of said photovoltaic cells, said battery operable to:
        store said electrical energy, and
        generate a first voltage level as an output;
    a DC/DC converter electrically connected to said battery, said DC/DC converter operable to:
        receive said first voltage level as an input, and
        produce a second voltage level as an output; and
    a load connection mechanism electrically connected to said DC/DC converter, wherein said load connection mechanism is operable to:
        receive said second voltage level from said DC/DC converter, and
        deliver said second voltage level to a load that is external to the electric vehicle platform;
    wherein said electric vehicle platform is portable.

2. The electric vehicle platform of claim 1, further comprising:
    a mast, wherein:
        said mast has a first end and a second end, and
        said first end of the mast is operably connected to said electric vehicle platform; and
    a rectenna operably connected to the second end of said mast;
    wherein:
        said rectenna is operable to:
            receive electromagnetic energy from an external source,
            convert said electromagnetic energy to DC electric energy, and
            communicate said DC electric energy to said battery.

3. The electric vehicle platform of claim 2, wherein said mast is telescopic with self-locking sections for extension and retraction at varying heights.

4. The electric vehicle platform of claim 3, further comprising a tracking system operably connected to said second end of said mast, wherein said tracking system is operable to move a position of said rectifier with respect to said mast.

5. The electric vehicle platform of claim 1, further comprising a tracking device operably connected to said light receiver, wherein said tracking device is a dual axis tracking system that is operable to rotate said light receiver on a 360° axis with respect to the electric vehicle platform.

6. The electric vehicle platform of claim 5, wherein said tracking device uses global positioning satellite signals to rotate said light receiver to direct said light receiver towards the sun.

7. The electric vehicle platform of claim 1, further comprising a supercapacitor electrically connected to said battery.

8. The electric vehicle platform of claim 1, wherein said load connection mechanism comprises at least a power plug outlet or a wireless energy transmitter.

9. The electric vehicle platform of claim 1, further comprising a power management system, wherein said power management system is operable to manage the electrical operations of at least two components associated with the electric vehicle platform.

10. The electric vehicle platform of claim 1, further comprising a plurality of wheels operatively implemented on said electric vehicle platform, wherein the electric vehicle platform is portable on said wheels.

11. The electric vehicle platform of claim 1, wherein said load is an electric vehicle.

12. A method of providing electrical energy to a load, comprising the steps of:
    collecting light energy by a light receiver through a plurality of lenses is said light receiver;
    receiving said light energy by a photovoltaic device;
    converting said light energy to electrical energy by one or more photovoltaic cells associated with said photovoltaic device, wherein:
        said photovoltaic device comprises a transparent four sided box,
        said one or more photovoltaic cells are stacked apart vertically or horizontally in said four sided box,
        said photovoltaic device is configured to deliver said light energy to said four sided box, and
        one or more reflective lenses are associated with said four sided box;
    storing said electrical energy in a battery, wherein said battery is electrically connected to said one or more photovoltaic cells;
    inputting a first voltage from said battery to a DC/DC converter;

outputting a second voltage from said DC/DC converter; and delivering said second voltage to a load via a load connection mechanism;

wherein:
all components to perform the steps are operably implemented on an electric vehicle platform;
said electric vehicle platform is portable; and
said load is external to said electric vehicle platform.

13. The method of providing electrical energy of claim 12, further comprising the steps of:

receiving electromagnetic energy by a rectenna;

converting said electromagnetic energy to DC electric energy by said; and communicating said DC electric energy from said rectenna to said battery;

wherein
a mast having a first end and a second end is operatively connected to said electric vehicle platform at said first end of the mast;
said rectenna is operably connected to said second end of said mast; and
said rectifier is in electrical communication with said battery.

14. The method of providing electrical energy of claim 13, wherein said mast is telescopic with self-locking sections for extension and retraction at varying heights.

15. The method of providing electrical energy of claim 14, further comprising the step of moving a position of said rectifier with respect to said mast with a tracking system operably connected to the second end of said mast.

16. The method of providing electrical energy of claim 12, further comprising the step of rotating said light receiver on a 360° axis with respect to the electric vehicle platform by a tracking device, wherein said tracking device is a dual axis tracking system.

17. The method of providing electrical energy of claim 16, wherein said tracking device uses global positioning satellite signals to rotate said light receiver to direct said light receiver towards the sun.

18. The method of providing electrical energy of claim 12, further comprising a supercapacitor electrically connected to said battery.

19. The method of providing electrical energy of claim 12, wherein said load connection mechanism comprises at least a power plug outlet or a wireless energy transmitter.

20. The method of providing electrical energy of claim 12, further comprising the step of managing the electrical operations of at least two components associated with the electrical vehicle platform with a power management system.

21. The method of providing electrical energy of claim 12, further comprising a plurality of wheels operatively implemented on said electric vehicle platform, wherein the electric vehicle platform is portable on said wheels.

22. The method of providing electrical energy of claim 12, wherein said load is an electric vehicle.

* * * * *